US00RE35052E

United States Patent [19]

Werquin et al.

[11] E Patent Number: Re. 35,052

[45] Reissued Date of Patent: Oct. 3, 1995

[54] METHOD FOR HOT ROLLING METAL STRIP WITH COMPOSITE METAL ROLLS

[75] Inventors: Jean-Claude Werquin, Ronchin; Bernard Mercier, Bellerive sur Allier, both of France

[73] Assignee: Forcast International, France

[21] Appl. No.: 21,035

[22] Filed: Feb. 23, 1993

Related U.S. Patent Documents

Reissue of:

[64] Patent No.: 4,507,366
Issued: Mar. 26, 1985
Appl. No.: 490,161
Filed: Apr. 29, 1983

U.S. Applications:

[63] Continuation of Ser. No. 206,177, Nov. 12, 1980, abandoned.

[30] Foreign Application Priority Data

Nov. 13, 1979 [FR] France ..... 79 27952

[51] Int. Cl.[6] ..... C23C 30/00

[52] U.S. Cl. ..... 428/682; 428/683; 428/684; 428/685

[58] Field of Search ..... 428/681–685; 72/366; 29/132, 129.5; 420/100, 34

[56] References Cited

U.S. PATENT DOCUMENTS

| | | | |
|---|---|---|---|
| 2,576,782 | 11/1951 | Daley . | |
| 3,342,058 | 9/1967 | Nemoto et al. . | |
| 3,553,993 | 1/1971 | Frostich et al. | 72/366 |
| 3,555,003 | 1/1971 | Frostich | 72/366 |
| 3,855,015 | 12/1974 | Nemoto et al. | 428/683 |
| 3,894,325 | 7/1975 | Maruta et al. . | |
| 3,968,551 | 7/1976 | Miyashita | 29/132 |
| 4,035,159 | 7/1977 | Hashimoto et al. . | |
| 4,043,843 | 8/1977 | Tanczyn . | |
| 4,064,608 | 12/1977 | Jeager | 428/684 |
| 4,365,995 | 12/1982 | Mori | 72/366 |
| 4,436,791 | 3/1984 | Bocquet | 428/682 |

FOREIGN PATENT DOCUMENTS

| | | | |
|---|---|---|---|
| 863704 | 5/1978 | Belgium . | |
| 1574542 | 7/1969 | France . | |
| 2086965 | 12/1971 | France . | |
| 2178319 | 11/1973 | France . | |
| 2374826 | 7/1978 | France | 29/132 |
| 2382955 | 10/1978 | France . | |
| 562829 | 10/1932 | Germany . | |
| 1284094 | 11/1965 | Germany . | |
| 2422629 | 11/1974 | Germany . | |
| 80350 | 12/1976 | Japan . | |
| 6220 | 1/1978 | Japan . | |
| 76119 | 1/1989 | Japan . | |
| 596653 | 5/1978 | U.S.S.R. . | |

(List continued on next page.)

OTHER PUBLICATIONS

Discussions on papers presented at sessions 'B' and 'C' at the Institute's Annual Conference at Stratford upon Avon in May, The British Foundryman, Nov. 1974, vol. 67, Part 11, pp. 312–315.

(List continued on next page.)

*Primary Examiner*—Deborah Yee
*Attorney, Agent, or Firm*—Cushman, Darby & Cushman

[57] ABSTRACT

The object of the invention is to improve the performance of the rolls of roughing and finishing stands of a hot strip train or mill and in particular to retard as far as possible the banding phenomenon, namely the phenomenon of the incrusting of hard oxides or scale formed at the convenience rolling temperatures.

For this purpose, the roll is made, at least in the working region thereof, from a chrome steel in which the ratio between the respective contents of chromium and carbon is between 7 and 12 and in which the content of equivalent carbon is between 1.5 and 1.7%. This content of equivalent carbon is calculated as the sum of the content of carbon and the content of chromium, the latter being given a coefficient 0.05.

10 Claims, No Drawings

FOREIGN PATENT DOCUMENTS

| | | |
|---|---|---|
| 279149 | 7/1926 | United Kingdom . |
| 504224 | 4/1938 | United Kingdom . |
| 1271959 | 4/1972 | United Kingdom . |

OTHER PUBLICATIONS

Werquin, Le Comportement Au Laminage De La Surface Des Cylindres De Travail De Premieres Cages De Groupe Finisseur A Chaud A Haute Teneur En Chrome, Bulletin du Cercle d'Etudes des Metaus Nov. 1973, pp. 195 and 226.

Maratray et al., Contribution A L'Etude Des Alliages Fe–Cr–Mo–C, Bulletin du Cercle d'Etudes des Metaux, Nov. 1973 pp. 11–55.

Kudrna, The Development of Highly Hypereutectoid Alloy Steels for Section Rolls, (Hutn. Listy, 1966, 21, (10), pp. 712–720).

Roesch, Die verschleissfesten Stahlgusssorten, Giesserei, Jun. 23, 1966, pp. 430–435.

R. V. Williams et al., Roll surface deterioration in hot strip mills, Journal of The Iron and Steel Institute, Apr. 1965, pp. 369–377.

W. J. Williams, Banding in Hot Strip Mill Work Rolls, Iron & Steel, Aug. 1962, pp. 372–383.

E. Peterson, Cause and Prevention of Hot Strip Work Roll Banding, Iron and Steel Engineer, Dec. 1956, pp. 98–101.

Patt, "Development, properties and applications of High Chromium Cast Steel in Hot Strip Mills, Plate Mills and cold Strip Mills", Karl Buch Roll–Foundry, 1979, pp. 1–19.

Kohira et al., The Recent Development of Rolls, Nippon Steel Technical Report Overseas No. 5, Mar. 1974 pp. 39–61.

Metal Abstracts, vol. 8, No. 11, Nov. 1975, p. 2024, Item 51 0746: Maksimov et al., "Experience in Making Cast Rolls for Hot–Rolling [Mills]", Liteinoe Proizv., Mar. 1975, (3), 18–19.

Staska et al., Untersuchungen an Fe–Cr–C–Legierungen mit Molybdänzusätzen, Mikrochimica Acta [Wien], Suppl. 5, 1974, pp. 111–127.

Schmitz, Liste der in der Bundesrepublic Deutschland hergestellten Eisenwerkstoffe, Stahl–Eisen–Liste, 1977, pp. 64–73.

Norman, Verschleissfeste Gusswerkstoffe—Stand und Entwicklungen, Giesserei–Praxis, Nr. 20/1969, pp. 359–364.

Harper, High Chromium Iron Roll Manufacture, 13th Annual Conference of Metallurgists (1974), Toronto, Canada, pp. 1–6 and FIGS. 1–23.

Stevens et al, Increasing Work Roll Life by Improving Roll Cooling Practice, 5th Bisra 21/23 Oct. 1969, pp. 86–109.

Durman, A Study of the Fractography of High Chromium Alloys, paper 14—St–Etienne 29/30 Nov., 1977 pp. 1–22.

Werquin et al., Nouveaux Developpements Des Cylindres A Haute Teneur En Chrome Pour Laminage A Chaud Et A Froid Des Metaux Ferreux Et Non Ferreux, Bulletin du Cercle D'Etude des Metaux Dec. 1978, pp. 261–292.

Bashnin et al., Selection of steels for manufacturing work rolls of 20–roll mills, Steel in the USSR, Dec. 1978, (12), pp. 688–690.

Maratray et al., Contribution A L'Etude De La Durete Ses Structures Martensitiques Et De La Retention D'Austenite, De Son Controle Et De Sa Transformation Dans Les Alliages Ferreus A Hautes Teneurs En Carbone Et En Chrome, Cercle d'etude des Metaux, Nov. 29, 1977.

Jackson et al., Metallurigical and production aspects of high chromium cast irons for abrasion resisting applications, The British Foundryman, Feb. 1974, pp. 34–41.

METHOD FOR HOT ROLLING METAL STRIP WITH COMPOSITE METAL ROLLS

Matter enclosed in heavy brackets [ ] appears in the original patent but forms no part of this reissue specification; matter printed in italics indicates the additions made by reissue.

This is a continuation of application Ser. No. 206,177, filed Nov. 12, 1980, now abandoned.

The present invention relates to rolling mill rolls for in particular roughing stands and the first finishing stands of a hot strip train or mill.

As concerns the rolls of these hot train stands, there is encountered a problem termed "banding" which consists in a phenomenon of the embedding in the surface of the rolls of hard scale or oxides which come from the rolled strip and are formed on this surface at the high rolling temperatures. These oxides are torn away from the surface of the roll, sometimes carrying along therewith certain parts of the metal, and are thereafter rolled in the following stands with the strip and result in a deterioration of the quality of this strip owing to the occurrence of surface defects termed "gravel". This is a serious problem since it leads either to a lowering of the rolling temperatures so as to limit the oxidation, which is not desirable, or the frequent replacement of the rolls which reduces the overall output of the rolling mill train.

In an effort to retard this phenomenon, a first solution consists in making the rolls from chrome iron, it being possible to employ chromium contents of from 12 to 20% whereas the carbon content is of the order of 2.5%. This first solution resulted in a certain improvement in particular as concerns the hardness of the roll. However, this improvement was found to be insufficient since with such chrome irons carbides are formed in the material of the roll which break and result in cracks which facilitate the encrusting of the oxides or scale.

In a second solution in an effort to solve this problem, it was attempted to employ steels containing between 1.3 to 1.9% of carbon and roughly between 1 to 1.5% of chromium, with a certain number of alloy elements moreover for improving the hardness. However, here again, this solution was not found to be absolutely satisfactory since the oxide which is formed on the surface of the roll is fragile and easily scales off and this increases the risk of adhesion between the roll and the strip and facilitates the encrusting phenomenon since, in scaling off, the oxide tears away a part of the metal. In an effort to overcome this drawback, an intense lubrication must be provided and this complicates the installation and increases the cost. Moreover, such rolls have a hardness which is insufficient to oppose the banding or encrusting phenomenon.

The problem that the invention is intended to solve is consequently to provide rolling mill rolls which are intended to equip mainly roughing stands for the first finishing stands of a hot strip train or mill, it being required that these rolls have an increased duration of utilization and be less susceptible to the encrusting phenomenon, notwithstanding the fact that these rolls operate under particularly difficult conditions.

The prescribed solution is based on an original approach which consists in associating more closely than in the past the carbon and chromium contents and in finding between these two elements an optimum ratio for the contemplated application. For this purpose, the invention provides a rolling mill roll whose surface is made from chrome steel and in which the ratio between the respective contents of chromium and carbon is between 7 and 12 and in which the content of equivalent carbon is between 1.5 and 1.7%, this content of equivalent carbon being calculated as the sum of the carbon content and the chromium content, the latter being given a coefficient of 0.05 said chrome steel excluding boron and tungsten apart from any traces of boron and tungsten as impurities.

These conditions result in carbon contents of between 0.9 and 1.3% and in chromium contents of between 6 and 15%, the other alloy elements, such as manganese, silicon, nickel, molybdenum, etc . . . , being chosen in accordance with the desired hardness.

In contrast to the situation with high chrome irons, the carbon content remains limited, which permits the avoidance of the formation of intergranular carbides of the type $M_7C_3$ which no heat treatment can put in solution. The chromium content is sufficient to obtain a matrix which is rich in chromium but however remains within such limits that the chromium oxide can form to a certain extent and constitute a protective lubricating layer which constitutes a positive element. It is therefore essential to conform to the aforementioned ratios and magnitudes.

It was found that a roll having such a composition has a much better structure than a chrome iron or a steel of the adamite type, in particular as concerns the secondary carbides which are extremely fine and dispersed.

A roll according to the invention may be made by a composite casting method and preferably by a centrifugal casting method, this type of method having the desired effect as concerns the refining and distribution of the carbides. By way of example, such a roll may have the following composition:

C: 0.96
Mn: 0.58
Si: 1.4
Ni: 0.62
Cr: 11.5
Mo: 1.13

In this composition, the ratio Cr/C is in the neighbourhood of 12 and the content of equivalent carbon equals 1.535.

This composition is of course that of the working surface or outer region of the roll whose heart or core may be made for example from nodular iron. *As is apparent from the foregoing, the roll is preferably bimetallic, lacking any partition wall.* After centrifugal casting, the roll is subjected to a suitable heat treatment comprising, for example, a simple quenching in air from a temperature of 1,000° C., if desired with a stage or step in the course of the cooling; these treatments are conventional and are consequently not described in more detail.

Such a roll has a hardness higher than 70 shore C.

Tests were carried out, in particular by using such a roll with a chrome iron roll of conventional design and composition C: 2.9—Si: 0.6—Mn: 0.91—Cr: 18.9—Ni: 0.92—Mo: 1.45. These two rolls were mounted together, while regularly reversing their positions, in the F3 stand of a hot continuous train or mill. It was found that, after an equivalent period of operation, the roll according to the invention had no geometrical wear and no trace of encrusting with oxide or scale, whereas the conventional roll already has a marked commencement of banding.

The object of the invention is therefore attained and a roll having in its working region the claimed composition has in the particularly difficult conditions of utilization encountered in roughing stands and in the first finishing stands of a hot train or mill, a behaviour and performance which are very substantially improved relative to known rolls, so that the overall output of the train or mill can be increased in the same proportions.

Having now described our invention what we claim as new and desire to secure by Letters Patent is:

[1. A mill comprising a stand including rolls operating under hot conditions, said rolls having an improved resistance to banding and each comprising a metal core and a radially outer cast chrome steel cylindrical working region, said cast chrome steel containing between 0.9 and 1.3% of carbon and between 6 and 15% of chromium, the ratio between respective contents of chromium and carbon being between 7 and 12 and the content of equivalent carbon being between 1.5 and 1.7%, said content of equivalent carbon being calculated as the sum of the content of carbon and the content of chromium with the content of chromium being given a coefficient of 0.05, said chrome steel excluding boron and tungsten apart from any traces of boron and tungsten as impurities.]

2. A method for hot rolling hot metal strip in a mill comprising a stand including rolls, said method comprising hot rolling the metal strip with composite metal rolls each of which rolls comprises a metal core and a radially outer cast chrome steel cylindrical working region, said cast chrome steel comprises between 0.9 and 1.3% of carbon and between 6 and 15% of chromium and wherein the ratio between respective contents of chromium and carbon is between 7 and 12 and the content of equivalent carbon is between 1.5 and 1.7%, said content of equivalent carbon being calculated as the sum of the content of carbon and the content of chromium with the content of chromium being given a coefficient of 0.05, said chrome steel excluding boron and tungsten apart from any traces of boron and tungsten as impurities.

3. A method for hot rolling hot metal strip in a mill comprising a stand including rolls, said method comprising hot rolling the metal strip with composite metal rolls each of which rolls comprises a metal core and a radially outer cast chrome steel cylindrical working region, said cast chrome steel comprises between 0.9 and 1.3% of carbon and between 6 and 15% of chromium and wherein the ratio between respective contents of chromium and carbon is between 7 and 12 and the content of equivalent carbon is between 1.5 and 1.7%, said equivalent carbon being calculated as the sum of the content of carbon and the content of chromium with the content of chromium being given a coefficient of 0.05.

*4. The method according to claim 1, wherein said strip is rolled with rolls of a roughing or finishing stand of a hot strip mill.*

*5. The method according to claim 2, wherein said strip is rolled with rolls of a roughing or finishing stand of a hot strip mill.*

*6. The method according to claim 1, wherein said strip is rolled with bimetallic rolls which lack a partition wall between metallic layers thereof.*

*7. The method according to claim 2, wherein said strip is rolled with bimetallic rolls which lack a partition wall between metallic layers thereof.*

*8. The method according to claim 1, wherein said strip is rolled with rolls which have been manufactured by centrifugal casting.*

*9. The method according to claim 2, wherein said strip is rolled with rolls which have been manufactured by centrifugal casting.*

*10. The method according to claim 1, wherein said strip is rolled with rolls having a core of nodular iron.*

*11. The method according to claim 2, wherein said strip is rolled with rolls having a core of nodular iron.*

* * * * *